2 Sheets--Sheet 1.

W. F. JEANS & D. H. BAILEY.
Machine for Counting Stock.

No. 167,254. Patented Aug. 31, 1875.

Witnesses
John L. Boone
C. M. Richardson

Inventors
William Francis Jeans
David Harrison Bailey
by Dewey & Co.
Attys

2 Sheets--Sheet 2.

W. F. JEANS & D. H. BAILEY.
Machine for Counting Stock.

No. 167,254. Patented Aug. 31, 1875.

Witnesses
John L. Boone
C. M. Richardson

Inventors
William Francis Jeans
David Harrison Bailey
by Dewey & Co
Attys

N. PETERS, PHOTO-LITHOGRAPHER, WASHINGTON, D. C.

UNITED STATES PATENT OFFICE.

WILLIAM F. JEANS AND DAVID H. BAILEY, OF FERNDALE, CALIFORNIA.

IMPROVEMENT IN MACHINES FOR COUNTING STOCK.

Specification forming part of Letters Patent No. 167,254, dated August 31, 1875; application filed October 15, 1874.

*To all whom it may concern:*

Be it known that we, WILLIAM F. JEANS and DAVID H. BAILEY, of Ferndale, Humboldt county, State of California, have invented a Machine for Counting Stock; and we do hereby declare the following description and accompanying drawings are sufficient to enable any person skilled in the art or science to which it most nearly appertains to make and use our said invention without further invention or experiment.

Our invention relates to an improved device and mechanism which is to be employed in automatically counting and registering stock, such as sheep, goats, hogs, or cattle, and this is done by causing the animals to pass singly through a narrow passage, so constructed that as the animal passes a side lever will be moved, which is so connected that it will operate an indicator and register the number of animals passing.

Figure 1:
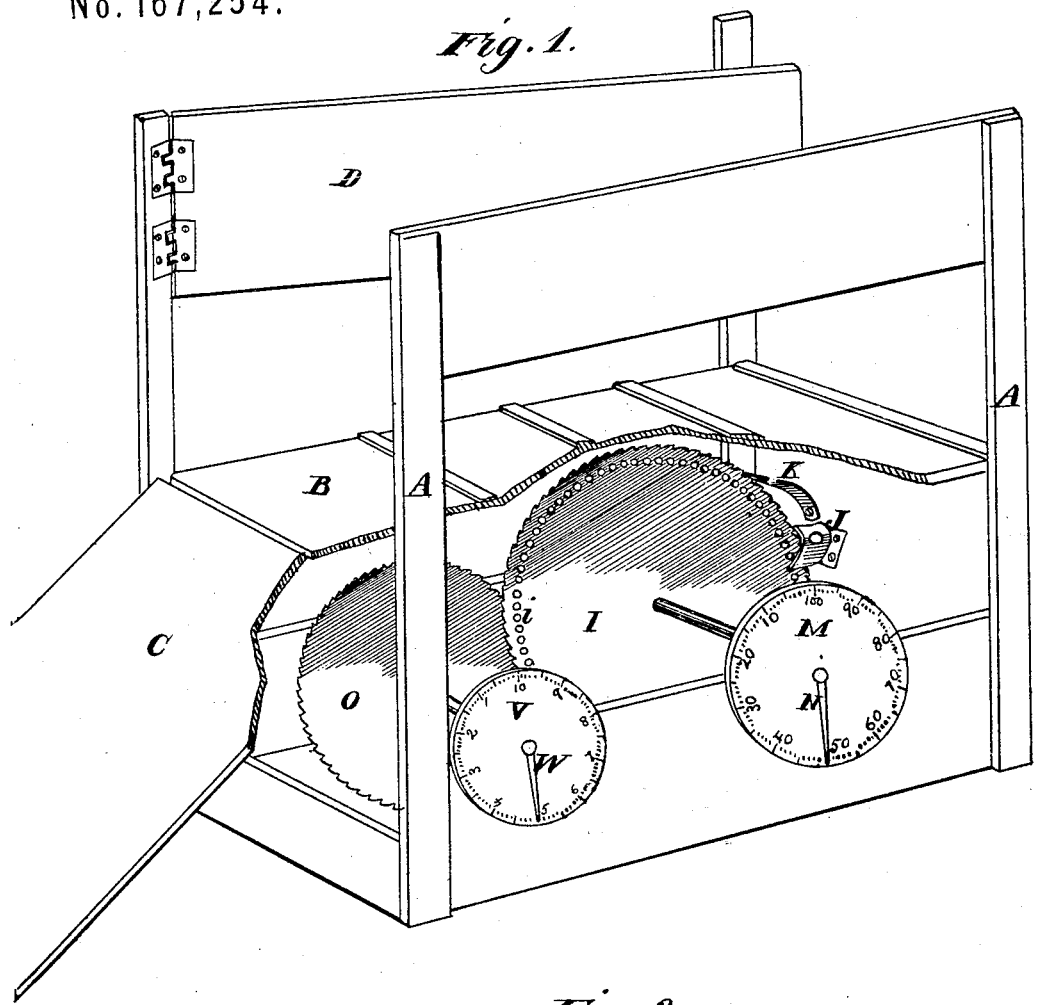
Figure 2:
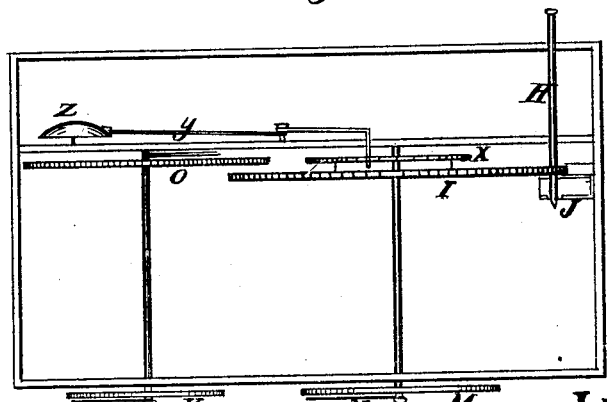
Figure 3:
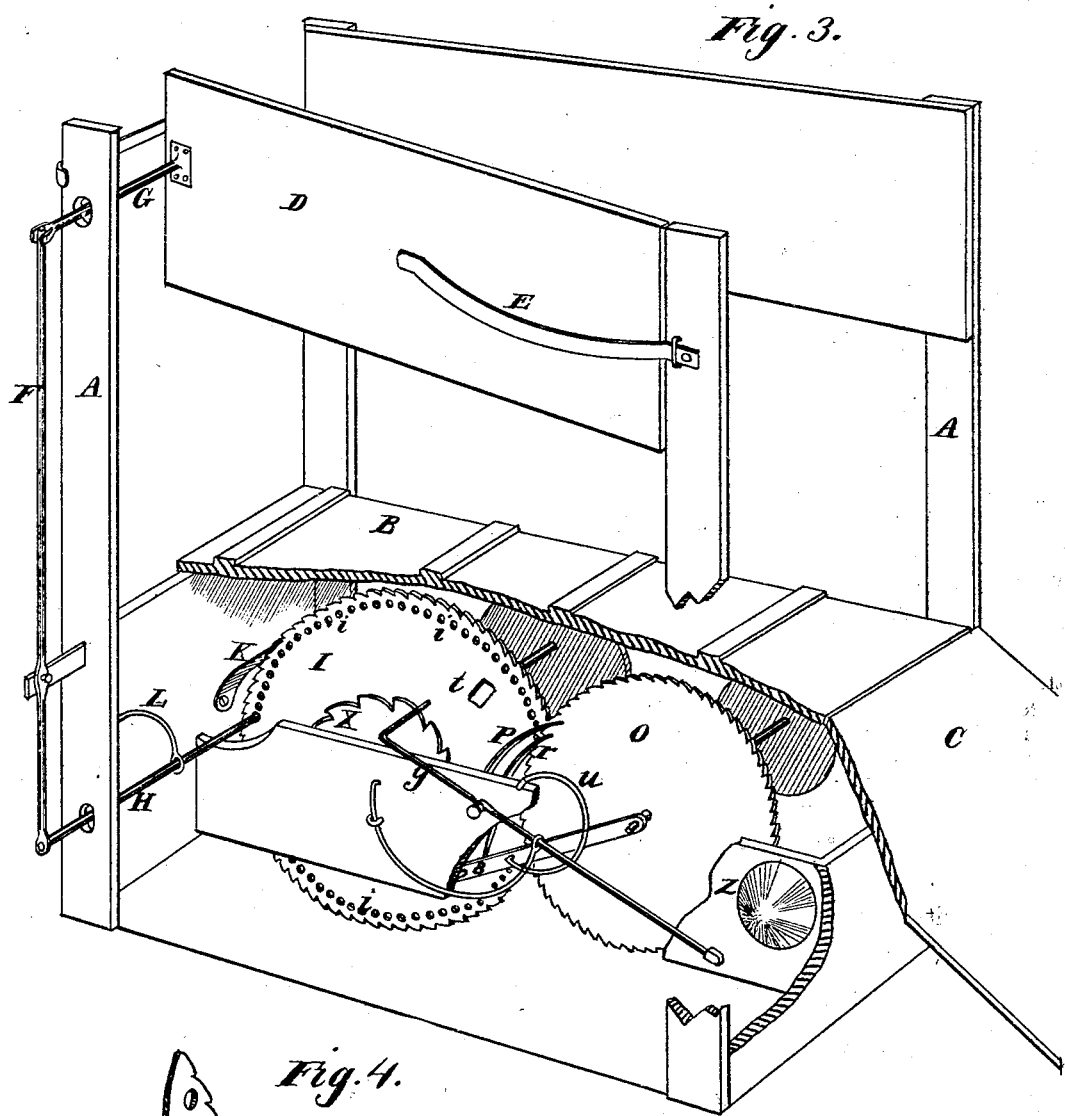
Figure 4:
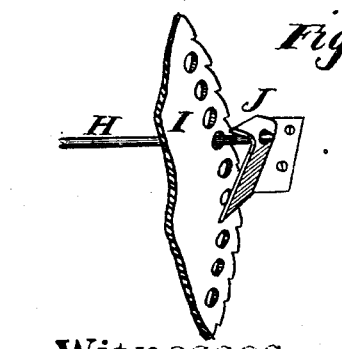

Referring to the accompanying drawings for a more complete explanation of our invention, Figure 1, Sheet 1, is a perspective view of our machine with a portion broken away. Fig. 2 is a horizontal section, showing the gearing and bell. Fig. 3, Sheet 2, is another perspective in section. Fig. 4 is a view of a portion of the counting-wheel.

A is a frame-work, which is built in the space between two corrals or inclosures, from one of which to the other the animals must pass. The lower part may be inclosed, and will contain the counting mechanism, and the upper part should be continued so high that the animals cannot escape over the top. A floor, B, is made across the machine, and the incline C leads to this floor, so that, in the case of animals, like sheep, who make a headlong rush, only one can pass at a time. The space between the sides of the machine is calculated to be only wide enough to allow the body of one animal to pass at one time, and one of the sides D of the machine is hinged at one end, and has a spring, E, pressing upon its outer face, so that it will force the free end of this swinging side inward and angularly across the narrow opening through which the animals must pass.

It will thus be seen that any animal passing through the passage must force this swinging side back far enough to allow him to get through, and this will be done whatever may be the manner of progression or rate of speed of the animal.

In order to connect this movable side with the counting apparatus, we employ a lever-arm, F, which is pivoted, at some point between its ends, to the side of one of the vertical posts of the frame, and has its upper end connected with the side piece D by a rod, G. Another rod, H, extends from the lower end of the lever F to the counting-wheel I, through the rim of which it passes at every vibration of the lever. The rim of the wheel I is pierced with one hundred holes, $i$, at equal distances apart, and the rod H passes through these holes successively as it vibrates. In order to rotate the wheel I by means of the movements of the rod, we fix an incline plane, J, at the side of the wheel opposite to the rod, and when the end of the rod comes through it moves up this inclined plane, and turns the wheel the distance between two holes. A pawl, K, holds the wheel at each movement, and a spring, L, causes the rod H to drop to its original position as soon as it is withdrawn from the hole. The dial M is placed on the outside of the machine, and an indicator-pointer, N, is secured to the shaft of the wheel I, to show the number of animals passing, up to one hundred. Any number above one hundred will be counted by a wheel, $o$, similar to I. This wheel has a pawl, P, which holds it from being carried backward, while another pawl, $r$, just below the first, has a projection, $s$, against which the lug $t$ on the wheel I strikes at every revolution of I, thus drawing the pawl $r$ down one tooth of the wheel $o$. When released, a spring, $u$, lifts the pawl $r$ up, and thus feeds the wheel forward one tooth, which is indicated by a dial, V, and pointer W.

It is often necessary to divide sheep or other stock in certain proportions, according to the different interests of proprietors. In order to do this accurately we have made a secondary toothed wheel, X, which is secured to the same shaft with the wheel I, and is divided into ten or any suitable number of teeth. A hammer-arm, $y$, is so pivoted that its upper end, being bent, will be actuated by the toothed wheel $x$. The hammer at the other end will strike a bell, $z$, as the end of the arm is released from each tooth.

By this means every tenth animal will be correctly indicated, and by a simple arrangement of gate the animals can be parted and turned into different corrals or inclosures after being counted. The swinging side D will be accurate in its movements, and must be opened and closed by the passage of each animal, whether it walks, runs, or jumps through. It cannot miss a count, or double count, as might be the case if it depended upon the weight of an animal upon the floor.

Having thus described our invention, what we claim, and desire to secure by Letters Patent, is—

1. The device consisting of the swinging side D of a passage, together with the lever-arm F, with its rods G and H, and the perforated wheel I and inclined plane J, the whole constructed to operate substantially as herein described.

2. The winged side D, lever-arm F, rods G H, and perforated wheel I, having the lug $t$, in combination with the wheel $o$, with its pawls P or toothed wheel $x$, hammer-arm $y$, bell $z$, and counting-dials, as set forth.

In witness whereof we hereunto set our hands and seals.

WILLIAM FRANCIS JEANS. [L. S.]
DAVID HARRISON BAILEY. [L. S.]

Witnesses:
C. M. RICHARDSON,
P. F. HART.